United States Patent
Yu et al.

(10) Patent No.: US 11,487,505 B2
(45) Date of Patent: Nov. 1, 2022

(54) PHYSICAL UNCLONABLE FUNCTION BASED TRUE RANDOM NUMBER GENERATOR, METHOD FOR GENERATING TRUE RANDOM NUMBERS, AND ASSOCIATED ELECTRONIC DEVICE

(71) Applicant: PUFsecurity Corporation, Hsinchu County (TW)

(72) Inventors: Chun-Yuan Yu, Hsinchu County (TW); Yung-Hsiang Liu, Hsinchu County (TW); Kai-Hsin Chuang, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 106 days.

(21) Appl. No.: 17/211,799

(22) Filed: Mar. 24, 2021

(65) Prior Publication Data
US 2021/0385094 A1 Dec. 9, 2021

Related U.S. Application Data

(60) Provisional application No. 63/034,410, filed on Jun. 4, 2020.

(51) Int. Cl.
*H04L 9/32* (2006.01)
*H04L 9/08* (2006.01)
(Continued)

(52) U.S. Cl.
CPC ............ *G06F 7/4876* (2013.01); *G06F 7/485* (2013.01); *G06F 7/4873* (2013.01);
(Continued)

(58) Field of Classification Search
CPC ...... G06F 7/4876; G06F 7/485; G06F 7/4873; G06F 7/49968; G06F 7/721;
(Continued)

(56) References Cited

U.S. PATENT DOCUMENTS 9,558,358 B2 1/2017 Aissi
2003/0059045 A1 3/2003 Ruehle
(Continued)

FOREIGN PATENT DOCUMENTS

CN 106020771 A 10/2016
TW I663604 B 6/2019
(Continued)

*Primary Examiner* — Quazi Farooqui
(74) *Attorney, Agent, or Firm* — Winston Hsu

(57) ABSTRACT

A Physical Unclonable Function (PUF) based true random number generator (TRNG), a method for generating true random numbers, and an associated electronic device are provided. The PUF based TRNG may include a first obfuscation circuit, a cryptography circuit coupled to the first obfuscation circuit, and a second obfuscation circuit coupled to the cryptography circuit. The first obfuscation circuit obtains a first PUF value from a PUF pool of the electronic device, and performs a first obfuscation function on a preliminary seed based on the first PUF value to generate a final seed. The cryptography circuit utilizes the final seed as a key of a cryptography function to generate preliminary random numbers. The second obfuscation circuit obtains a second PUF value from the PUF pool, and performs a second obfuscation function on the preliminary random numbers based on the second PUF value to generate final random numbers.

20 Claims, 6 Drawing Sheets

(51) Int. Cl.
  *G06F 7/487* (2006.01)
  *G06F 7/499* (2006.01)
  *G06F 7/485* (2006.01)

(52) U.S. Cl.
  CPC ........ *G06F 7/49968* (2013.01); *H04L 9/0869* (2013.01); *H04L 9/3278* (2013.01); *H04L 2209/12* (2013.01); *H04L 2209/16* (2013.01)

(58) Field of Classification Search
  CPC . H04L 9/0869; H04L 9/3278; H04L 2209/12; H04L 2209/16; H04L 9/32; H04L 9/08
  See application file for complete search history.

(56) References Cited

U.S. PATENT DOCUMENTS

| | | |
|---|---|---|
| 2009/0204656 A1 | 8/2009 | Goettfert |
| 2012/0079281 A1 | 3/2012 | Lowenstein |
| 2015/0006601 A1* | 1/2015 | Aissi .................. H04L 63/0428 708/250 |
| 2021/0091952 A1* | 3/2021 | Wentz .................. H01L 23/573 |

FOREIGN PATENT DOCUMENTS

| | | |
|---|---|---|
| TW | I673721 B | 10/2019 |
| TW | 201944231 A | 11/2019 |

* cited by examiner

PHYSICAL UNCLONABLE FUNCTION BASED TRUE RANDOM NUMBER GENERATOR, METHOD FOR GENERATING TRUE RANDOM NUMBERS, AND ASSOCIATED ELECTRONIC DEVICE

CROSS REFERENCE TO RELATED APPLICATIONS

This application claims the benefit of U.S. provisional application No. 63/034,410, which was filed on Jun. 4, 2020, and is included herein by reference.

BACKGROUND OF THE INVENTION

1. Field of the Invention

The present invention is related to true random number generators, and more particularly, to a Physical Unclonable Function (PUF) based true random number generator (TRNG), a method for generating true random numbers, and an associated electronic device.

2. Description of the Prior Art

A Physically Unclonable Function (PUF) may be regarded as an on-chip fingerprint. As physical characteristics of different chips may be slightly different from each other due to some uncontrollable factors in the manufacturing process, these differences are unable to be copied or predicted, and may be utilized as static entropy values for security-related applications. In some related arts, a PUF pool may require storage space in an electronic device. More particularly, for a purpose of improving randomness of PUF based TRNG output values, required hardware resources will be accordingly increased. Thus, there is a need for a novel architecture and an associated method, to improve security property and output randomness of a PUF based true random number generator without introducing any side effect or in a way that is less likely to introduce side effects.

SUMMARY OF THE INVENTION

Thus, an objective of the present invention is to provide a Physical Unclonable Function (PUF) based true random number generator (TRNG), a method for generating true random numbers, and an associated electronic device, to improve overall performance of a PUF based TRNG without greatly increase overall hardware costs.

At least one embodiment of the present invention provides a PUF based TRNG of an electronic device. The PUF based TRNG may comprise a first obfuscation circuit, a cryptography circuit coupled to the first obfuscation circuit, and a second obfuscation circuit coupled to the cryptography circuit. The first obfuscation circuit is configured to obtain a first PUF value from a PUF pool of the electronic device, and perform a first obfuscation function on a preliminary seed based on the first PUF value to generate a final seed. The cryptography circuit is configured to utilize the final seed as a key of a cryptography function to generate a sequence of preliminary random numbers. The second obfuscation circuit is configured to obtain a second PUF value from the PUF pool, and perform a second obfuscation function on the sequence of preliminary random numbers based on the second PUF value to generate a sequence of final random numbers.

At least one embodiment of the present invention provides a method for generating true random numbers, wherein the method is applicable to an electronic device. The method may comprise: utilizing a first obfuscation circuit to perform a first obfuscation function on a preliminary seed based on a first Physical Unclonable Function (PUF) value to generate a final seed; utilizing a cryptography circuit to take the final seed as a key of a cryptography function to generate a sequence of preliminary random numbers; and utilizing a second obfuscation circuit to perform a second obfuscation function on the sequence of preliminary random numbers based on a second PUF value to generate a sequence of final random numbers. In particular, the first PUF value and the second PUF value are obtained from a PUF pool of the electronic device.

At least one embodiment of the present invention provides an electronic device. The electronic device may comprise a PUF pool and a TRNG coupled to the PUF pool. The PUF pool is configured to provide one or more PUF values. The TRNG may comprise a first obfuscation circuit, a cryptography circuit coupled to the first obfuscation circuit, and a second obfuscation circuit coupled to the cryptography circuit. The first obfuscation circuit is configured to obtain a first PUF value of the one or more PUF values from the PUF pool, and perform a first obfuscation function on a preliminary seed based on the first PUF value to generate a final seed. The cryptography circuit is configured to utilize the final seed as a key of a cryptography function to generate a sequence of preliminary random numbers. The second obfuscation circuit is configured to obtain a second PUF value of the one or more PUF values from the PUF pool, and perform a second obfuscation function on the sequence of preliminary random numbers based on the second PUF value to generate a sequence of final random numbers.

The PUF based TRNG, the associated method, and the associated electronic device of the embodiments of the present invention can enhance overall performance with various features such as cryptography functions (e.g. good security property and good pseudo randomness), dynamic entropy (e.g. provide "live" entropy to a system, in particular, the electronic device) and static entropy (e.g. PUF, which is regarded as an on-chip fingerprint). Thus, the embodiments of the present invention can improve the security property and the output randomness of the PUF based TRNG without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
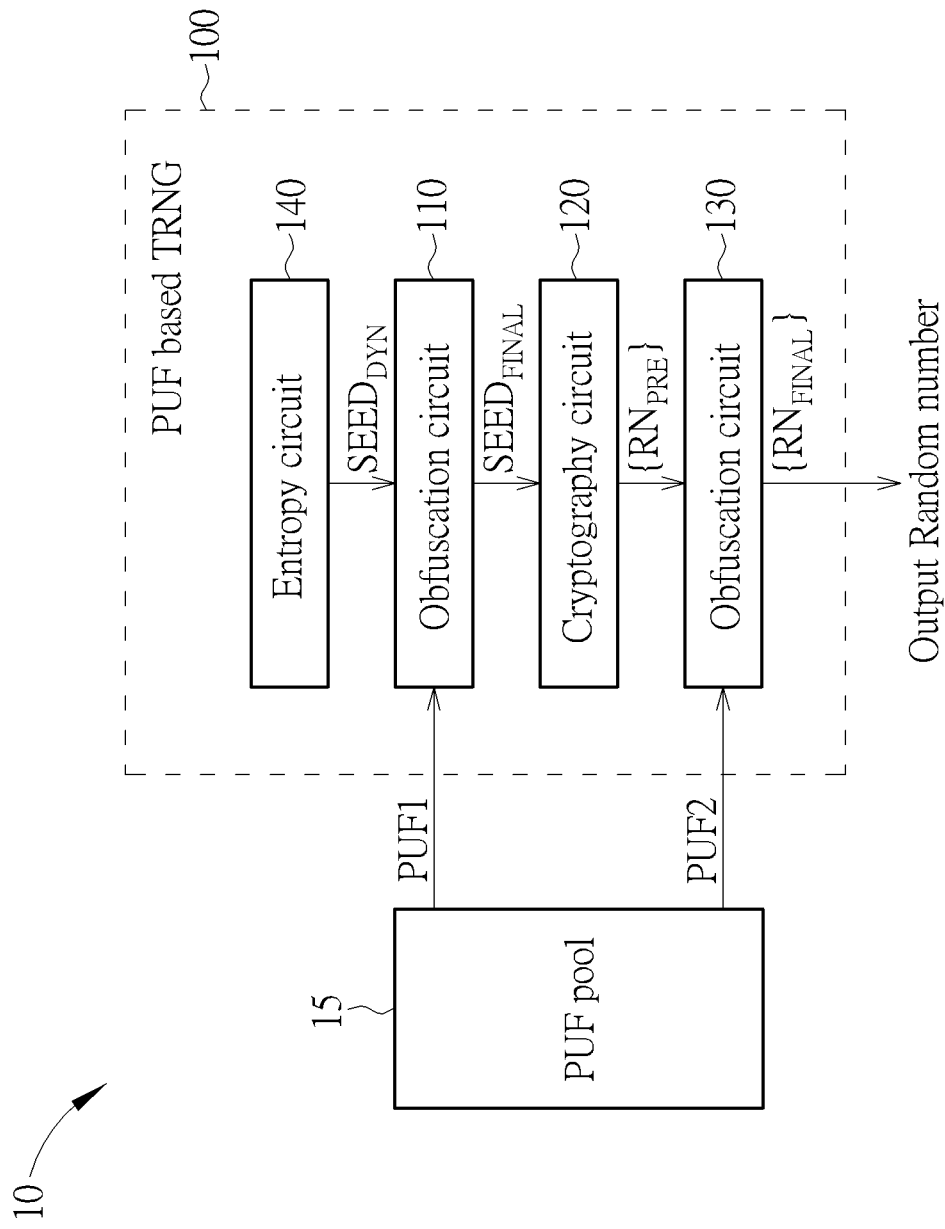
FIG. 1 is a diagram illustrating an electronic device according to an embodiment of the present invention.

FIG. 1 is a diagram illustrating an electronic device 10 according to an embodiment of the present invention, wherein the electronic device 10 may comprise a Physical Unclonable Function (PUF) pool 15 and a PUF based true random number generator (TRNG) 100 coupled to the PUF pool 15. As shown in FIG. 1, the PUF based TRNG 100 may comprise a first obfuscation circuit such as a obfuscation circuit 110, a cryptography circuit 120, and a second obfuscation circuit such as a obfuscation circuit 130, where the cryptography circuit 120 is coupled to the obfuscation circuit 110, and the obfuscation circuit 130 is coupled to the cryptography circuit 120. In this embodiment, the obfuscation circuit 110 may be configured to obtain a first PUF value such as PUF value PUF1 from the PUF pool 15, and perform a first obfuscation function on a preliminary seed based on the PUF value PUF1 to generate a final seed $SEED_{FINAL}$. The cryptography circuit 120 may be configured to utilize the final seed $SEED_{FINAL}$ as a key of a cryptography function to generate a sequence of preliminary random numbers $\{RN_{PRE}\}$. For example, the cryptography circuit 120 may perform a cryptography algorithm of DES, AES, RSA, or MD5. The obfuscation circuit 130 may be configured to obtain a second PUF value such as PUF value PUF2 from the PUF pool 15, and perform a second obfuscation function on the sequence of preliminary random numbers $\{RN_{PRE}\}$ based on the PUF value PUF2 to generate a sequence of final random numbers $\{RN_{FINAL}\}$, where each of the final random numbers $\{RN_{FINAL}\}$ may be an output random number of the PUF based TRNG 100 when needed.

In this embodiment, the PUF based TRNG 100 may further comprise an entropy circuit 140 configured to provide an entropy seed such as a dynamic entropy seed $SEED_{DYN}$ to be the preliminary seed. For example, the entropy circuit 140 may at least comprise an oscillator configured to output random single-bit values. In detail, the oscillator can generate a periodic signal varying between logic "0" and logic "1" under an oscillation frequency, and the value of the periodic signal can be sampled under a sampling frequency (e.g. sampled by a sampler built on an output terminal of the oscillator, where the sampler is controlled by the sampling frequency), in order to output the random single-bit values, where the sampling frequency may be different from the oscillation frequency (e.g. the sampling frequency may be lower than the oscillation frequency). Due to some factors such as temperature, noise, etc., the logic "0" and logic "1" of the periodic signal generated by the oscillator may be sampled in a random manner, and thereby making the logic "0" and the logic "1" randomly occur in the random single-bit values. In addition, as physical characteristics of different chips may be slightly different from each other due to some uncontrollable factors in the manufacturing process, these differences are unable to be copied or predicted, which may be reflected on PUF values (e.g. PUF1 and PUF2) in the PUF pool 15 of the electronic device 10. Thus, these PUF values may be regarded as an on-chip fingerprint, which provide static entropy in this embodiment. In some embodiments, the first PUF value may be different from the second PUF value (e.g. PUF1≠PUF2).

In order to determine whether a sequence of random number is available, the sequence have to pass some test items defined in National Institute of Standards and Technology (NIST)-800-22. Although the dynamic entropy seed $SEED_{DYN}$ generated by the entropy circuit 140 based on an oscillator indeed has a certain level of randomness, the dynamic entropy seed $SEED_{DYN}$ might still hard to pass all of the test items of NIST-800-22. For example, the dynamic entropy seed $SEED_{DYN}$ might be able to pass a binary matrix rank test, a non-overlapping template matching test, a linear complexity test and a random excursion variant test, but might fails to pass a frequency (monobit) test, a frequency within a block test, a runs test, a longest run ones in a block test, a discrete Fourier transform (spectral) test, an Overlapping template matching test, a Maurer's universal statistical test, a serial test, an approximate entropy test, a cumulative sums test and a random excursion test. However, after the processing of the obfuscation circuit 110 and the cryptography circuit 120, the sequence of preliminary random numbers $\{RN_{PRE}\}$ can pass all of the above test items. The frequency (monobit) test is configured to detect whether probabilities of occurring "0" and "1" is close to each other. The run test is configured to detect whether the longest consecutive "0" and the longest consecutive "1" is reasonable (e.g. less than a predetermined threshold). The non-overlapping template matching test is configured to detect whether the repeated pattern of a sequence of random numbers is reasonable (e.g. determining whether the pattern is regularly repeated or randomly repeated). As these test items are defined in the well-known standard NIST-800-22, those skilled in this art should understand meanings of all of the test items, and related details are omitted here for brevity.

In this embodiment, any (e.g. each) of the first obfuscation function and the second obfuscation function may comprise addition arithmetic (e.g. addition operation), multiplication arithmetic (e.g. multiplication operation), permutation, substitution, one-way function, encryption or a combination thereof. For example, any (e.g. each) of the obfuscation circuits 110 and 130 may be an exclusive-OR (XOR) logic circuit, for implementing the addition arithmetic function. Those skilled in this art should understand how to implement logic circuits corresponding to other types of obfuscation functions mentioned above, and related details are omitted here for brevity. In some embodiments, the first obfuscation function may be the same as the second obfuscation function (e.g. the obfuscation circuits 110 and 130 may be implemented by the same type of logic circuits). In some embodiments, the first obfuscation function may be different from the second obfuscation function (e.g. the obfuscation circuits 110 and 130 may be implemented by different types of logic circuits). When each of the obfuscation circuits 110 and 130 is the exclusive-OR (XOR) logic circuit, the obfuscation circuit 110 performs exclusive-OR operation on the dynamic entropy seed $SEED_{DYN}$ with the PUF value PUF1 to generate the final seed $SEED_{FINAL}$, and the obfuscation circuit 130 performs exclusive-OR operation on preliminary random numbers $\{RN_{PRE}\}$ with the PUF value PUF2 to generate the final random numbers $\{RN_{FINAL}\}$.

In one embodiment, the obfuscation circuit 110 may perform concatenation on the preliminary seed such as the dynamic entropy seed $SEED_{DYN}$ with the PUF value PUF1 (e.g. by serially arranging the dynamic entropy seed $SEED_{DYN}$ and the PUF value PUF1) to generate the final seed. For example, assuming that the dynamic entropy seed $SEED_{DYN}$ is an M-bit digital value and the PUF value PUF1 is an N-bit digital values, and the obfuscation circuit 110 may take the dynamic entropy seed $SEED_{DYN}$ as the first M bits of the final seed $SEED_{FINAL}$ and further take the PUF value PUF1 as the last N bits of the final seed $SEED_{FINAL}$, in order to generate the (M+N)-bit final seed $SEED_{FINAL}$.

In one embodiment, the cryptography function may comprise a cipher function (e.g. stream cipher such as Trivium) or a hash function. When a specific key (e.g. the final seed $SEED_{FINAL}$) is input to the cryptography circuit 120, a corresponding bit stream with good security property and good pseudo randomness will be output. If the key is unchanged when the electronic device 10 is booted every time, the corresponding bit stream will be unchanged every time. For a purpose of further improving the security property and the randomness, the key utilized by the cryptography circuit 120 may be dynamic. As the final seed $SEED_{FINAL}$ is generated based on the dynamic entropy seed $SEED_{DYN}$ and the PUF value PUF1, benefits of using the dynamic entropy seed $SEED_{DYN}$ and the PUF value PUF1 can be brought to the sequence of preliminary random numbers $\{RN_{PRE}\}$ generated by the cryptography circuit 120, thereby improving the security property and the randomness. Furthermore, even if the cryptography function is implemented by a well-known method or standard, a person skilled in this art is still hard to trace back from the random numbers $\{RN_{FINAL}\}$ to decipher the cryptography function, since the final output (i.e. $\{RN_{FINAL}\}$) is generated by the obfuscation circuit 130 based on the PUF value PUF2, which is unpredictable as mentioned above. Thus, security property of the sequence of final random numbers $\{RN_{FINAL}\}$ can be further enhanced. It should be noted that the cryptography function is not limited to specific type of cryptography function. Some well-known algorithms can also be adopted on the cryptography function of the present invention.

Figure 2:
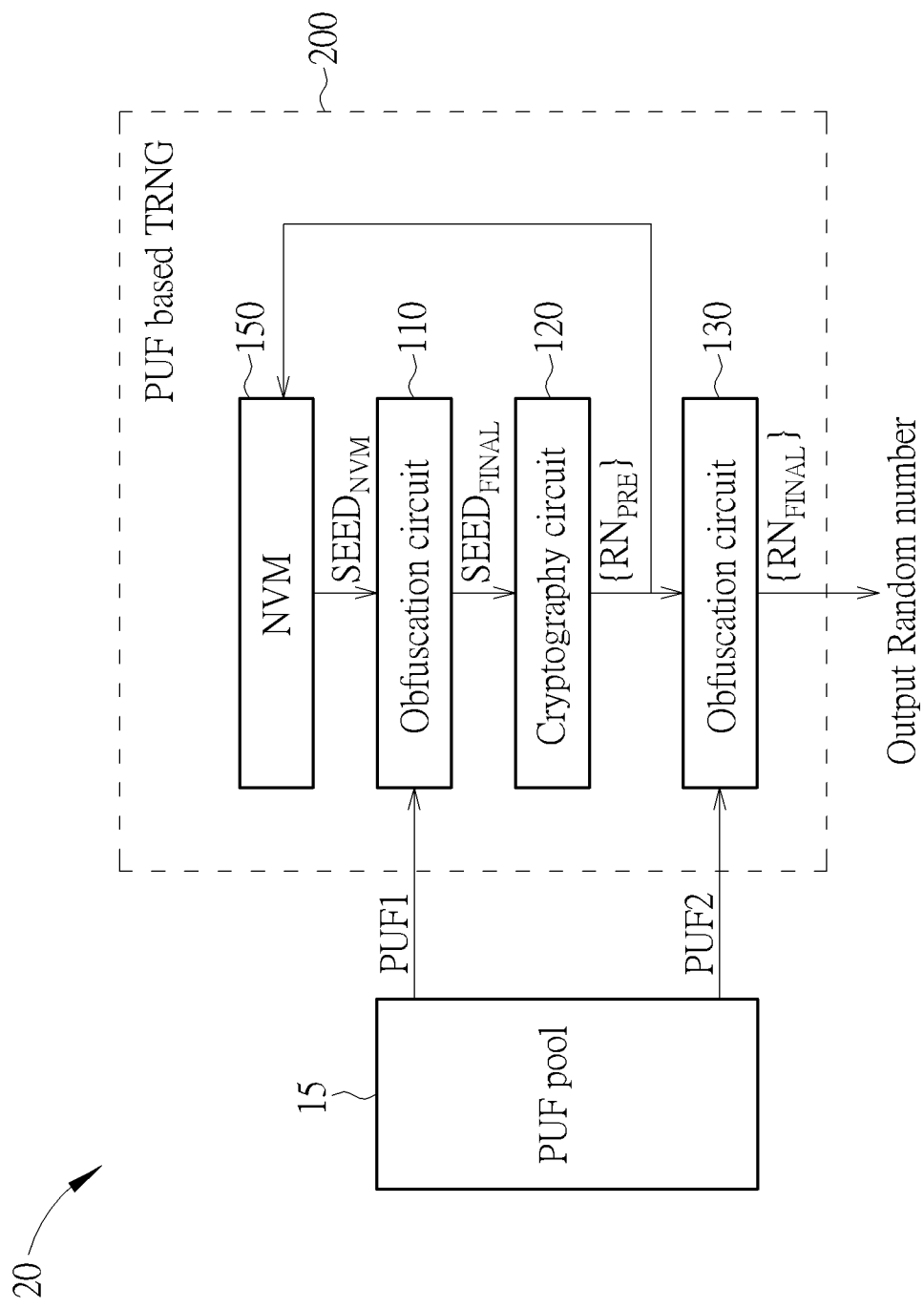
FIG. 2 is a diagram illustrating an electronic device according to an embodiment of the present invention.
Figure 3:
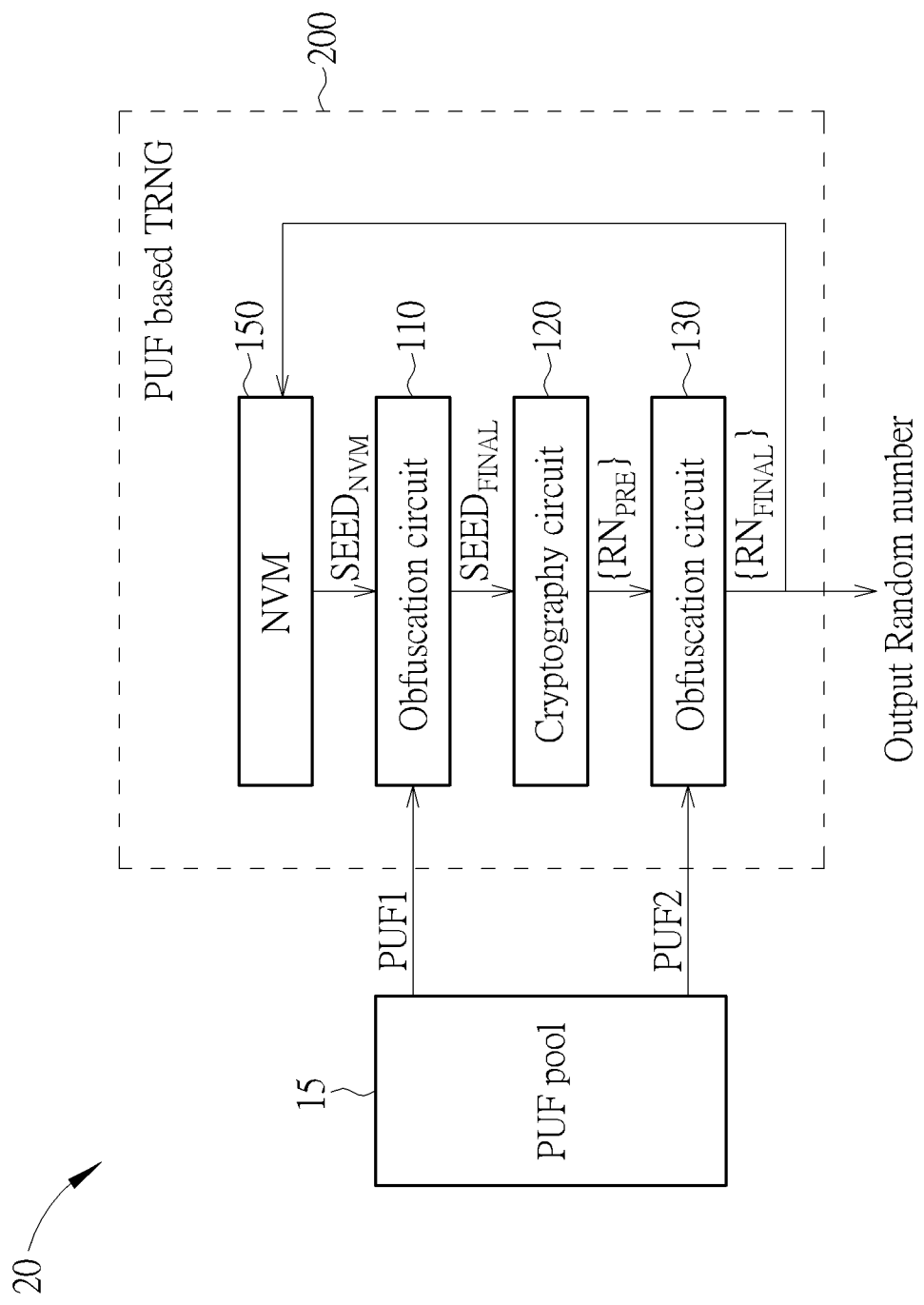
FIG. 3 is a diagram illustrating an electronic device according to another embodiment of the present invention.

FIG. 2 is a diagram illustrating an electronic device 20 according to an embodiment of the present invention, where the electronic device 20 may comprise the PUF pool 15 and a PUF based TRNG 200 coupled to the PUF pool 15. The embodiment of FIG. 2 is similar to FIG. 1, and the main difference is the PUF based TRNG 200 may comprise a non-volatile memory (NVM) 150 configured to provide the preliminary seed, and more particularly, provide an NVM seed $SEED_{NVM}$ stored in the NVM 150 to be the preliminary seed. In addition, a feedback random number may be written into the NVM 150 at one or more time points, to update the NVM seed $SEED_{NVM}$ stored in the NVM. In one embodiment, the feedback random number may be obtained from the sequence of preliminary random numbers $\{RN_{PRE}\}$ as shown in FIG. 2. In another embodiment, the feedback random number may be obtained from the sequence of final random numbers $\{RN_{FINAL}\}$ as shown in FIG. 3. Similar to the embodiment of FIG. 1, each of the final random numbers $\{RN_{FINAL}\}$ may be an output random number of the PUF based TRNG 200 when needed.

It should be noted that the time point for updating the NVM seed $SEED_{NVM}$ stored in the NVM 150 is not meant to be a limitation of the present invention. For example, the feedback random number may be the first random number of the sequence of preliminary random numbers $\{RN_{PRE}\}$ or the sequence of final random numbers $\{RN_{FINAL}\}$ after the electronic device 20 is booted, and once this first random number is generated, this first random number may be written into the NVM 150. In another example, the feedback random number may be written into the NVM 150 to update the NVM seed $SEED_{NVM}$ in every predetermined time period. In yet another example, when the electronic device 20 receives a power-off command, the feedback random number may be the latest random number of the sequence of preliminary random numbers $\{RN_{PRE}\}$ or the sequence of final random numbers $\{RN_{FINAL}\}$ after the electronic device 20 is booted, and the latest random number may be written into the NVM 150 to update the NVM seed $SEED_{NVM}$ before the electronic device 20 is shut down.

Figure 4:
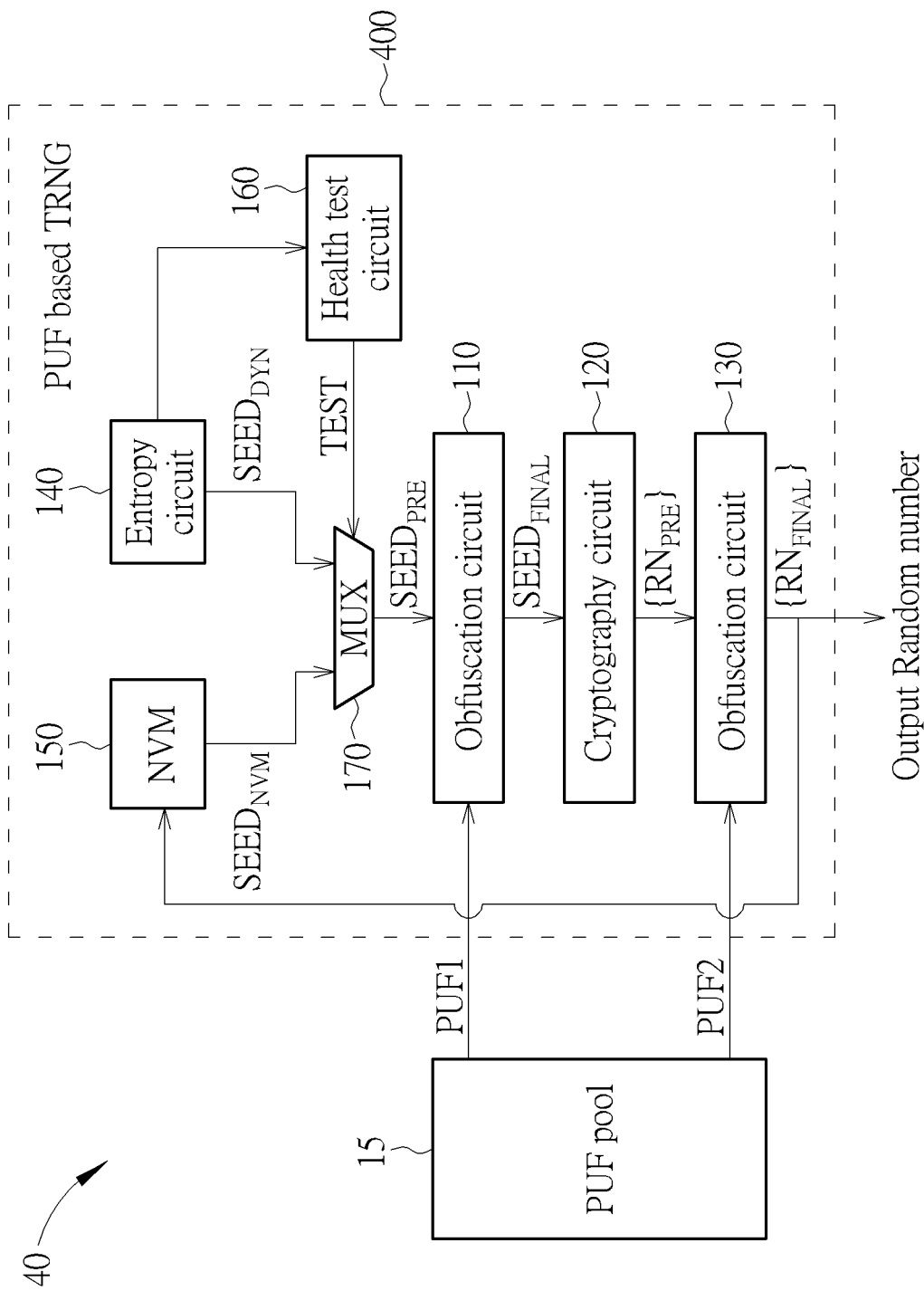
FIG. 4 is a diagram illustrating an electronic device according to an embodiment of the present invention.

FIG. 4 is a diagram illustrating an electronic device 40 according to an embodiment of the present invention. As shown in FIG. 4, the electronic device 40 may comprise the PUF pool 15 and a PUF based TRNG 400 coupled to the PUF pool 15, where the PUF based TRNG 400 may be regarded as a combination of the PUF based TRNG 100 shown in FIG. 1 and the PUF based TRNG 200 shown in any of FIG. 2 and FIG. 3 as well as one or more additional circuits. In particular, the PUF based TRNG 400 may comprise the obfuscation circuit 110, the cryptography circuit 120, the obfuscation circuit 130, the entropy circuit 140 and the NVM 150 mentioned in the above embodiments, and may further comprise a health test circuit 160 and a multiplexer (MUX) 170. In this embodiment, the health test circuit 160 is coupled to the entropy circuit 140, and the MUX 170 is coupled to the entropy circuit 140, the NVM 150 and the health test circuit 160. For example, the health test circuit 160 may be configured to perform at least one test on the dynamic entropy seed $SEED_{DYN}$ (or any data/signals related to the operations of the entropy circuit 140) to generate a test result TEST, and the MUX 170 may be configured to respond to the test result TEST to select one of the dynamic entropy seed $SEED_{DYN}$ and the NVM seed $SEED_{NVM}$, for being output as the preliminary seed (e.g. $SEED_{PRE}$) to the obfuscation circuit 110.

In particular, the MUX 170 may select the dynamic entropy seed $SEED_{DYN}$ to be the preliminary seed $SEED_{PRE}$ when the test result TEST indicates that the entropy circuit 140 is in a healthy state, and the MUX 170 may select the NVM seed $SEED_{NVM}$ to be the preliminary seed $SEED_{PRE}$ when the test result TEST indicates that the entropy circuit 140 is in an unhealthy state. For example, the health test circuit 160 can collect a certain number of random single-bit values from the oscillator within the entropy circuit 140 as one group of data once every predetermined time period. If the health test circuit 160 detects that a coverage rate of the logic "0" (or the logic "1") within one group of data falls in a predetermined range (e.g. from 20% to 80%), the health test circuit 160 will output the test result TEST with a first logic state (e.g. "0") to indicate that the entropy circuit 140 is "healthy", and the MUX 170 will select the $SEED_{DYN}$ to be the preliminary seed $SEED_{PRE}$. If the health test circuit 160 detects that the coverage rate of the logic "0" (or the logic "1") within one group of data fails to fall in the predetermined range (e.g. is greater than a predetermined upper bound such as 80% or less than a lower bound such as 20%), the health test circuit 160 will output the test result TEST with a second logic state (e.g. "1") to indicate that the entropy circuit 140 is "unhealthy", and the MUX 170 will select the $SEED_{NVM}$ to be the preliminary seed $SEED_{PRE}$. It should be noted that the detailed operation related to the aforementioned at least one test is for illustrative purposes only, and is not meant to be a limitation of the present invention, e.g. one or more of the test items defined in the NIST-800-22 standard can also be adopted in the aforementioned at least one test.

Under some conditions, any of the entropy circuit 140 and the NVM 150 may have the risk of being hacked or damaged from outside of the electronic device 40, thereby introducing security issues. As the obfuscation circuit 110 has two sources for obtaining the preliminary seed $SEED_{PRE}$, if one of the entropy circuit 140 and the NVM 150 is hacked or damaged, another one can take place to provide the preliminary seed $SEED_{PRE}$. Thus, the robustness and security property of the PUF based TRNG 400 can be enhanced.

In some embodiments, the health test circuit 160 may be omitted, and the MUX 170 can respond to another control signal in order to select one of the dynamic entropy seed $SEED_{DYN}$ and the NVM seed $SEED_{NVM}$ for being output as the preliminary seed $SEED_{PRE}$, where this control signal can be obtained from outside of the electronic device 40. For example, by controlling the logic state of this control signal, a user can manually control the MUX to select one of the dynamic entropy seed $SEED_{DYN}$ and the NVM seed $SEED_{NVM}$ for being output as the preliminary seed $SEED_{PRE}$, and the health test circuit 160 may be omitted, but the present invention is not limited thereto.

Figure 5:
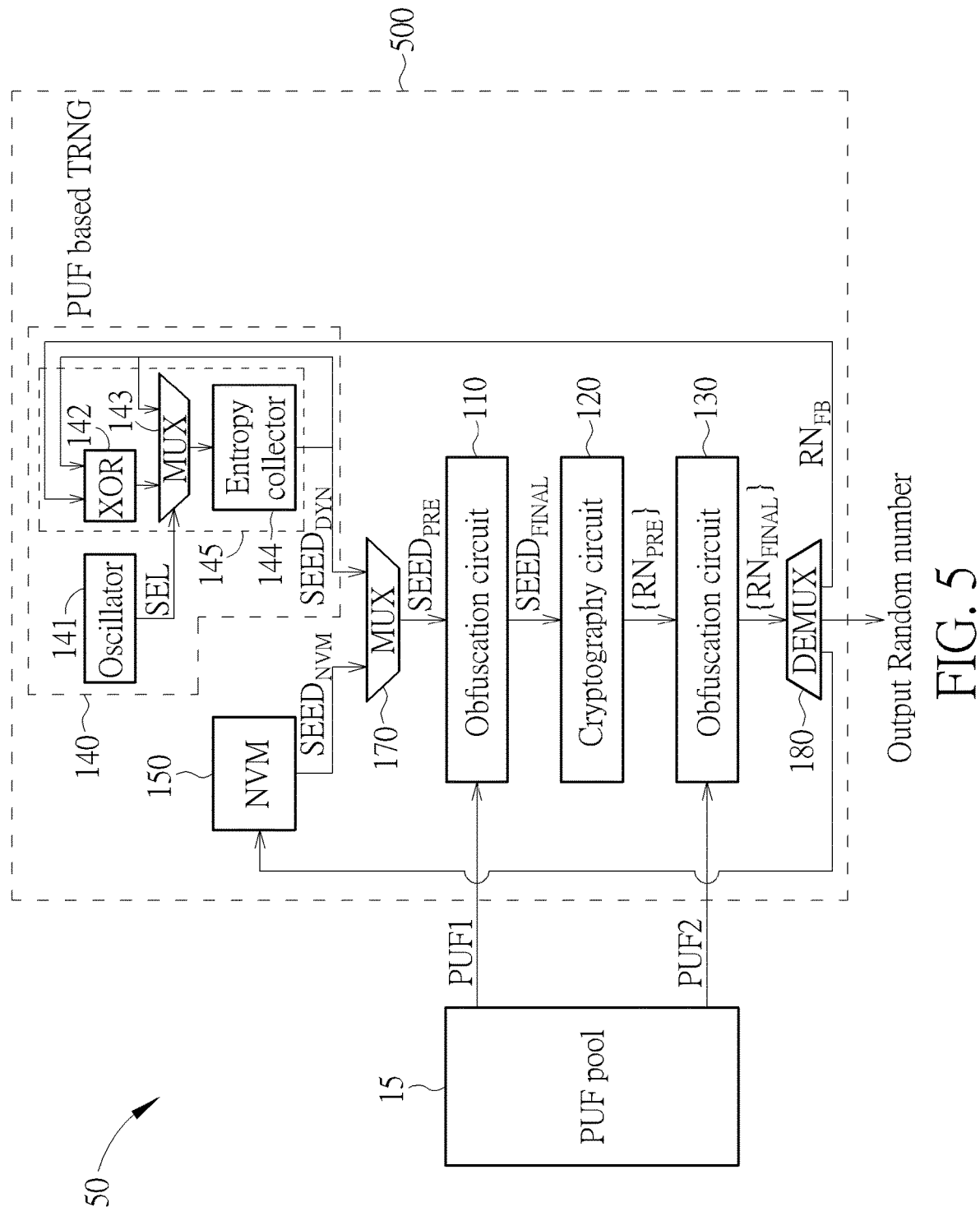
FIG. 5 is a diagram illustrating an electronic device according to an embodiment of the present invention.

FIG. 5 is a diagram illustrating an electronic device 50 according to an embodiment of the present invention. As shown in FIG. 4, the electronic device 50 may comprise the PUF pool 15 and a PUF based TRNG 500 coupled to the PUF pool 15, where the PUF based TRNG 500 may be regarded as an example of the PUF based TRNG 400 shown in FIG. 4, and the health test circuit 160 is not shown in FIG. 5 for brevity. In particular, FIG. 5 illustrates detailed implementation of the entropy circuit 140. In this embodiment, the entropy circuit 140 may comprise an oscillator 141 and a selective entropy collector 145 coupled to the oscillator 141, where the oscillator 141 may be configured to output a random control bit SEL (e.g. each of the aforementioned random single-bit values), and the selective entropy collector 145 may respond to the random control bit SEL, to determine whether to update the dynamic entropy seed $SEED_{DYN}$ with aid of a feedback random number $RN_{FB}$. In the embodiment of FIG. 5, the feedback random number $RN_{FB}$ is obtained from the sequence of final random numbers $\{RN_{FINAL}\}$, but the present invention is not limited thereto. In some embodiments, the feedback random number $RN_{FB}$ is obtained from the sequence of preliminary random numbers $\{RN_{PRE}\}$, but the present invention is not limited thereto. In detail, the selective entropy collector 145 may comprise a third obfuscation circuit such as an XOR logic circuit 142, a MUX 143 coupled to the oscillator 141 and the XOR logic circuit 142, and an entropy collector 144 coupled to the MUX 143 and the XOR logic circuit 142. For example, the third obfuscation circuit such as the XOR logic circuit 142 may be configured to perform a third obfuscation function such as an XOR operation on the dynamic entropy seed $SEED_{DYN}$ based on the feedback random number $RN_{FB}$ to generate an updated entropy seed, and the MUX 143 may be configured to respond to the random control bit SEL, to select one of the entropy seed before being updated (i.e. the entropy seed from the output of the entropy collector 144) and the updated entropy seed, in order to output a latest entropy seed (e.g. a latest version of the dynamic entropy seed $SEED_{DYN}$). Furthermore, the entropy collector 144 may receive and output the latest entropy seed to be the dynamic entropy seed $SEED_{DYN}$, and the dynamic entropy seed $SEED_{DYN}$ is a feedback entropy seed being transmitted to the MUX 143 and the XOR logic circuit 142. Accordingly, the XOR logic circuit 142 performs the XOR operation to generate the updated entropy seed which is the XOR result of the dynamic entropy seed $SEED_{DYN}$ and the feedback random number $RN_{FB}$, and the MUX 143 may output the updated entropy seed or the dynamic entropy seed $SEED_{DYN}$ before being updated according to the random control bit SEL to the entropy collector 144, where the entropy collector 144 may be implemented by flip-flops, but the present invention is not limited thereto. That is, the operation of updating the dynamic entropy seed $SEED_{DYN}$ can be randomly performed as the random control bit SEL is randomly switched between the logic states "0" and "1". For example, when the random control bit SEL is "0", the dynamic entropy seed $SEED_{DYN}$ will be unchanged; and when the random control bit SEL is "1", the dynamic entropy seed $SEED_{DYN}$ will be updated. It should be noted that the XOR circuit 142 is not meant to limit the implementation of the third obfuscation circuit, where any logic circuit that is capable of changing the dynamic entropy seed $SEED_{DYN}$ should belong to the scope of the present invention.

In the embodiment of FIG. 5, when the MUX 170 selects the NVM seed $SEED_{NVM}$ and the MUX 143 selects the updated entropy seed, the dynamic entropy seed $SEED_{DYN}$ can be generated according to the NVM seed $SEED_{NVM}$. In detail, when the MUX 170 selects the NVM seed $SEED_{NVM}$ to be the preliminary seed $SEED_{PRE}$, the feedback random number $RN_{FB}$ is generated according to the $SEED_{PRE}$ thus the XOR logic circuit 142 generates the XOR result according to the $RN_{FB}$ which is generated according to the NVM seed $SEED_{NVM}$. Then the MUX 143 outputs the XOR result to be the updated entropy seed which is generated according to the NVM seed $SEED_{NVM}$ thus the entropy collector 144 can generate the dynamic entropy seed $SEED_{DYN}$ according to the NVM seed $SEED_{NVM}$.

In addition, the embodiment of FIG. 5 is not meant to be a limitation of the present invention. In some embodiments, the entropy circuit 140 shown in FIG. 1 and FIG. 4 may be implemented by different architecture. For example, the entropy circuit 140 may comprise an oscillator and a collecting circuit coupled to the oscillator, where the oscillator may be configured to output random single-bit values, and the collecting circuit may be configured to collect these random single-bit values to generate the dynamic entropy seed $SEED_{DYN}$ (e.g. by concatenating (e.g. serially arranging) a predetermined number of random single-bit values from these random single-bit values to generate the dynamic entropy seed $SEED_{DYN}$), but the present invention is not limited thereto.

Furthermore, each final random number within the sequence of final random numbers $\{RN_{FINAL}\}$ is preferably to be transmitted to one object only. For example, the PUF based TRNG 500 may further comprise a de-multiplexer (DEMUX) 180 coupled to the obfuscation circuit 130 as shown in FIG. 5. In this embodiment, there are three possible signal paths for the sequence of final random numbers $\{RN_{FINAL}\}$, including a first signal path configured to provide an output random number to outside of the PUF based TRNG 500, a second signal path configured to update the NVM seed $SEED_{NVM}$, and a third signal path configured to update the dynamic entropy seed $SEED_{DYN}$, where the DEMUX 180 controls that only one of these signal paths is enabled at a single time point. Thus, any single final random number obtained from the sequence of final random numbers $\{RN_{FINAL}\}$ will not be reused by different components, and therefore the security property of the PUF based TRNG 500 can be guaranteed. For example, the first final random number of the sequence of final random numbers $\{RN_{FINAL}\}$ after the electronic device 50 is powered on (e.g. the second signal path is enabled in the first operation cycle after the electronic device 50 is powered on) by default, then the second signal path is disabled and the third signal path is enabled after the NVM seed $SEED_{NVM}$ stored in the NVM 150 has been updated, and the first signal path is enabled only when another component within the electronic device 50 requests for a random number. It should be noted that the schedule of enabling the first signal path, the second signal path and the third signal path mentioned above is for illustrative purposes only, and is not meant to be a limitation of the present invention.

Figure 6:
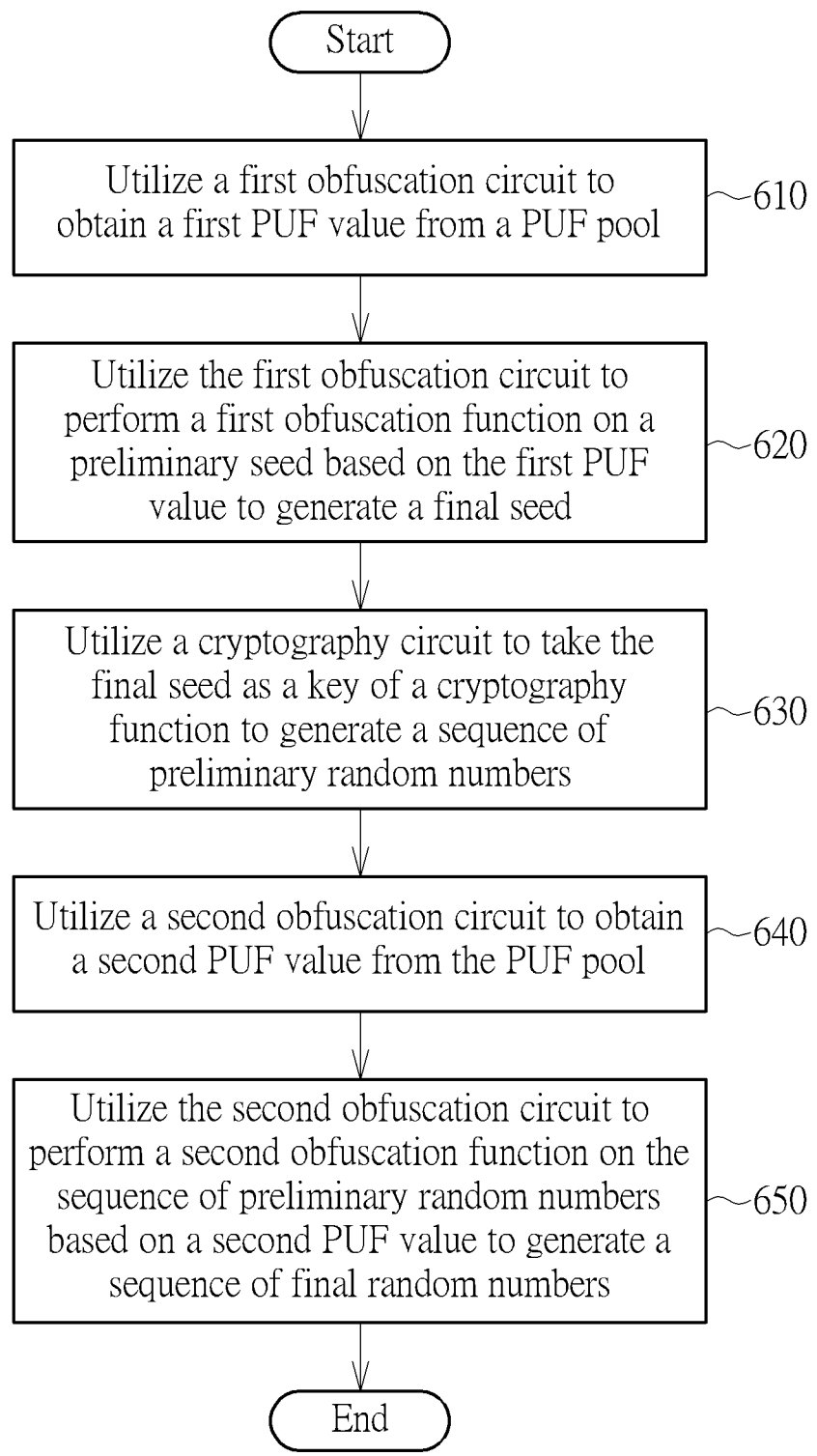
FIG. 6 is a working flow illustrating a method for generating true random numbers according to an embodiment of the present invention.

FIG. 6 is a working flow illustrating a method for generating true random numbers according to an embodiment of the present invention, wherein the method is applicable to an electronic device such as the electronic devices 10, 20, 40 and 50 shown in FIG. 1 to FIG. 5. It should be noted that the working flow shown in FIG. 6 is for illustrative purposes only, and is not meant to be a limitation of the present invention. One or more steps may be added, deleted or modified in the working flow shown in FIG. 6. In addition, if a same result may be obtained, these steps do not have to be executed in the exact order shown in FIG. 6.

In Step 610, the obfuscation circuit 110 obtains a first PUF value (e.g. PUF1) from the PUF pool 50.

In Step 620, the obfuscation circuit 110 performs a first obfuscation function (e.g. XOR) on a preliminary seed (e.g. $SEED_{PRE}$) based on the first PUF value (e.g. PUF1) to generate a final seed (e.g. $SEED_{FINAL}$).

In Step 630, the cryptography circuit 120 utilizes the final seed (e.g. $SEED_{FINAL}$) as a key of a cryptography function to generate a sequence of preliminary random numbers (e.g. $\{RN_{PRE}\}$).

In Step 640, the obfuscation circuit 130 obtains a second PUF value (e.g. PUF2) from the PUF pool 50.

In Step 650, the obfuscation circuit 130 performs a second obfuscation function (e.g. XOR) on the sequence of preliminary random numbers (e.g. $\{RN_{PRE}\}$) based on the second PUF value (e.g. PUF2) to generate a sequence of final random numbers $\{RN_{FINAL}\}$.

The PUF based TRNG, the associated method, and the associated electronic device of present invention can control associated operations with various features such as cryptography functions, dynamic entropy and static entropy. In addition, the size requirement of the PUF pool can be reduced without degrading randomness and security properties. Thus, the present invention can improve overall performance of the PUF based TRNG without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Physical Unclonable Function (PUF) based true random number generator (TRNG) of an electronic device, the PUF based TRNG comprising:
a first obfuscation circuit, configured to obtain a first PUF value from a PUF pool of the electronic device, and perform a first obfuscation function on a preliminary seed based on the first PUF value to generate a final seed;
a cryptography circuit, coupled to the first obfuscation circuit, configured to utilize the final seed as a key of a cryptography function to generate a sequence of preliminary random numbers; and
a second obfuscation circuit, coupled to the cryptography circuit, configured to obtain a second PUF value from the PUF pool, and perform a second obfuscation function on the sequence of preliminary random numbers based on the second PUF value to generate a sequence of final random numbers.

2. The PUF based TRNG of claim 1, wherein the first obfuscation circuit performs concatenation on the preliminary seed with the first PUF value to generate the final seed.

3. The PUF based TRNG of claim 1, wherein the PUF based TRNG further comprises an entropy circuit configured to provide the preliminary seed, and the entropy circuit comprises:
an oscillator, configured to output random single-bit values; and
a collecting circuit, configured to collect the random single-bit values to generate the preliminary seed.

4. The PUF based TRNG of claim 1, wherein the PUF based TRNG further comprises a non-volatile memory (NVM) configured to provide the preliminary seed, a feedback random number is written into the NVM at one or more time points, to update the preliminary seed stored in the NVM, and the feedback random number is obtained from the sequence of preliminary random numbers or the sequence of final random numbers.

5. The PUF based TRNG of claim 1, wherein the PUF based TRNG further comprises:
an entropy circuit, configured to provide an entropy seed;
a non-volatile memory (NVM), configured to provide an NVM seed, wherein a feedback random number is written into the NVM at one or more predetermine time points, to update the NVM seed stored in the NVM, and the feedback random number is obtained from the sequence of preliminary random numbers or the sequence of final random numbers;
a health test circuit, coupled to the entropy circuit, configured to performs at least one test on the entropy seed to generate a test result; and
a multiplexer, coupled to the entropy circuit, the NVM and the health test circuit, configured to respond to the test result to select one of the entropy seed and the NVM seed, for being output as the preliminary seed.

6. The PUF based TRNG of claim 5, wherein the multiplexer selects the entropy seed to be the preliminary seed when the test result indicates that the entropy circuit is in a healthy state, and the multiplexer selects the NVM seed to be the preliminary seed when the test result indicates that the entropy circuit is in an unhealthy state.

7. The PUF based TRNG of claim 1, wherein the PUF based TRNG further comprises an entropy circuit configured to provide an entropy seed, and the entropy circuit comprises:
an oscillator, configured to output a random control bit; and
a selective entropy collector, coupled to the oscillator, wherein the selective entropy collector responds to the random control bit, to determine whether to update the entropy seed with aid of a feedback random number, and the feedback random number is obtained from the sequence of preliminary random numbers or the sequence of final random numbers.

8. The PUF based TRNG of claim 7, wherein the selective entropy collector comprises:
a third obfuscation circuit, configured to perform a third obfuscation function on the entropy seed based on the feedback random number to generate an updated entropy seed; and
a first multiplexer, coupled to the oscillator, configured to respond to the random control bit, to select one of the entropy seed before being updated and the updated entropy seed, in order to output a latest entropy seed.

9. The PUF based TRNG of claim 8, wherein the PUF based TRNG further comprises:

a non-volatile memory (NVM), configured to provide an NVM seed, wherein the feedback random number is written into the NVM at one or more predetermine time points, to update the NVM seed stored in the NVM; and a second multiplexer coupled to the NVM and the selective entropy collector, configured to select one of the NVM seed and the entropy seed to be the preliminary seed;

wherein when the second multiplexer selects the NVM seed, the updated entropy seed is generated based on the feedback random number which is generated based on the NVM seed.

10. The PUF based TRNG of claim 1, wherein the PUF based TRNG further comprises an entropy circuit configured to provide the preliminary seed, and the entropy circuit at least comprises:

an oscillator, configured to output random single-bit values, wherein the oscillator generates a periodic signal varying between a first logic value and a second logic value under an oscillation frequency, and the periodic signal is sampled under a sampling frequency, in order to make the first logic value and the second logic value randomly occurs in the random single-bit values;

wherein the sampling frequency is different from the sampling frequency.

11. A method for generating true random numbers, applicable to an electronic device, comprising:

utilizing a first obfuscation circuit to perform a first obfuscation function on a preliminary seed based on a first Physical Unclonable Function (PUF) value to generate a final seed;

utilizing a cryptography circuit to take the final seed as a key of a cryptography function to generate a sequence of preliminary random numbers; and utilizing a second obfuscation circuit to perform a second obfuscation function on the sequence of preliminary random numbers based on a second PUF value to generate a sequence of final random numbers;

wherein the first PUF value and the second PUF value are obtained from a PUF pool of the electronic device.

12. The method of claim 11, wherein utilizing the first obfuscation circuit to perform the first obfuscation function on the preliminary seed based on the first PUF value to generate the final seed comprises:

utilizing the first obfuscation circuit to perform concatenation on the preliminary seed and the first PUF value to generate the final seed.

13. The method of claim 12, further comprising:
generating random single-bit values; and
obtaining the preliminary seed according to the random single-bit values.

14. The method of claim 12, further comprising:
obtaining the preliminary seed from a non-volatile memory (NVM), wherein a feedback random number is written into the NVM at one or more predetermined time points, to update the preliminary seed stored in the NVM, and the feedback random number is obtained from the sequence of preliminary random numbers or the sequence of final random numbers.

15. The method of claim 12, further comprising:
obtaining an entropy seed from an entropy circuit;
obtaining a non-volatile memory seed from an NVM, wherein a feedback random number is written into the NVM at one or more predetermined time points, to update the NVM seed stored in the NVM, and the feedback random number is obtained from the sequence of preliminary random numbers or the sequence of final random numbers;

utilizing a health test circuit to perform at least one test on the entropy seed to generate a test result; and utilizing a multiplexer to respond to the test result to select one of the entropy seed and the NVM seed, for being output as the preliminary seed.

16. The method of claim 15, wherein the step of selecting one of the entropy seed and the NVM seed comprises:

selecting the entropy seed to be the preliminary seed when the test result indicating that the entropy circuit is in a healthy state; and selecting the NVM seed to be the preliminary seed when the test result indicating that the entropy circuit is in an unhealthy state.

17. The method of claim 11, further comprising:
generating a random control bit; and
determining whether to update an entropy seed with aid of a feedback random number in response to the random control bit, wherein the feedback random number is obtained from the sequence of preliminary random numbers or the sequence of final random numbers.

18. The method of claim 17, wherein the step of determining whether to update the entropy seed with aid of the feedback random number in response to the random control bit comprises:

performing a third obfuscation function on the entropy seed based on the feedback random number to generate an updated entropy seed; and selecting one of the entropy seed before being updated and the updated entropy seed in response to the random control bit, in order to output a latest entropy seed.

19. The method of claim 18, further comprising:
obtaining a non-volatile memory (NVM) seed from a NVM, wherein the feedback random number is written into the NVM at one or more predetermine time points, to update the NVM seed stored in the NVM; and selecting one of the NVM seed and the entropy seed to be the preliminary seed;

wherein when the NVM seed is selected, the updated entropy seed is generated based on the feedback random number which is generated based on the NVM seed.

20. The method of claim 18, wherein the step of generating the random control bit comprises:

utilizing an oscillator to generate a periodic signal varying between a first logic value and a second logic value under an oscillation frequency;

sampling the periodic signal under a sampling frequency, in order to make the first logic value and the second logic value randomly occurs in random single-bit values output from the oscillator to generate the random control bit;

wherein the sampling frequency is different from the oscillation frequency.

* * * * *